United States Patent [19]

Feldman

[11] 4,444,925

[45] Apr. 24, 1984

[54] FLOOR COMPOSITION

[75] Inventor: Joseph G. Feldman, Fall River, Mass.

[73] Assignee: Gyp-Crete Corporation, Hamel, Minn.

[21] Appl. No.: 450,332

[22] Filed: Dec. 16, 1982

[51] Int. Cl.³ ................................................ C08K 3/00
[52] U.S. Cl. ...................................... 524/4; 524/394; 524/423; 524/492; 524/557
[58] Field of Search ............... 524/423, 557, 394, 492, 524/3, 4, 5; 106/109

[56] References Cited

U.S. PATENT DOCUMENTS 4,174,230  11/1979  Hashimoto et al. ................ 106/109

Primary Examiner—Joseph L. Schofer
Assistant Examiner—J. M. Reddick
Attorney, Agent, or Firm—James R. Haller

[57] ABSTRACT

A sub-flooring mix comprising a composition of calcium sulfate hemihydrate and other additives; and sand and water. Polyvinyl alcohol is added to the composition, which prevents surface dusting when the mix sets.

4 Claims, No Drawings

FLOOR COMPOSITION

BACKGROUND AND BRIEF SUMMARY OF THE INVENTION

This invention relates generally to a poured flowable flooring particularly applicable for sub-floors commonly installed in multifloored structures, such as apartment buildings, industrial complexes, office buildings and also for those buildings which are rehabilitated while retaining the existing structure.

The most relevant prior art is believed to be best represented by U.S. Pat Nos. 4,075,374 and 4,159,912. In the '374 patent, a mix of calcium sulfate hemihydrate with a latex emulsion composition, water and sand was found not suitable in actual use. The deficiencies of the '374 patent are set forth in the '912 patent. The mix of the '912 patent is apparently in widespread use. Although the '912 patent overcame the deficiencies of the '374 patent, it has been found in some instances that when the aforementioned mixes set up, the topmost surface has a dusty or dust-like surface. Where the mix is poured as a sub-flooring, the uppermost surface in these floors in some instances must be treated, such as by cleaning and sealing in order to successfully apply the final top flooring.

The present invention relates to cementitious products of certain physical characteristics which are particularly adapted for sub-floors. The sub-floors are typically of the type wherein there is an existing substrate onto which a slurry-like mix is poured. Typically, the mix comprises calcium sulfate hemihydrate, water, sand and other additives. The additives enhance particulate distribution, drying time, crystalline formation, strength and surface characteristics.

Broadly, my invention comprises a composition of calcium sulfate hemihydrate with additives to prevent foaming, to extend the set up time, enhance mixing and, most importantly, to control crystalline structure and prevent or inhibit 'dusting' on the top finished surface. The additive which provides these last-mentioned properties is a vinyl polymer. With my invention, the composition is mixed with sand and water, and the sand is uniformally suspended in the mix for a long period of time, say for up to two hours, during which time the mix sets up.

Typically, when such mixes 'set up', excess water migrates to the top surface and carries with it fine particulates. As the evaporation continues to completion, these particulates settle out and deposit on the topmost surface which results in a powdery residual of particulate material. This is, the particulates migrate to the top surface which is easily chipped or damaged and may require further treatment prior to application of the actual floor.

My composition allows the mix to set to final hardness without the formation of a top dusty surface and requires less water than most commercially available comparable mixes. A particular polymeric material is added to the composition which polymeric material is believed to prevent the migration of the particulate material to the top surface during the evaporation step. Although the exact chemical phenomenon involved is not fully understood, what is known is that a product is provided which sets with a dust free, crack resistant surface under normal conditions of use prior to the application of finish flooring.

DESCRIPTION OF THE PREFERRED EMBODIMENT

The following example exemplifies a composition and mix embodying my invention.

EXAMPLE

| MIX | |
|---|---|
| Composition: | Quantity: |
| Calcium sulfate hemihydrate (100% atmospheric) | 80 lbs. |
| Polyvinyl alcohol | 0.45 gr. |
| Extender | 22 72 gr. |
| Surfactant | 36.32 gr. |
| Fluidizer | 108.8 gr. |
| Sand | 189 lbs. |
| Water | 6.5–8.5 gal. |

Based on a quantity of 80 lbs. of calcium sulfate hemihydrate the polyvinyl alcohol may be increased or decreased in an amount of 50% by weight; the extender may be increased in an amount of 25% by weight; the surfactant may be increased or decreased in an amount of 50% by weight; the fluidizer may be increased or decreased in an amount of approximately 50% by weight; and the sand may be as little as 150 lbs. or a maximum of 200 lbs.; all of the above may be varied alone or in any combination thereof.

The calcium sulfate hemihydrate used in the example is that which is available from U.S. Gypsum and sold under the name, Puritan Pottery. The calcium sulfate hemihydrate may be atmospheric or pressure calcined 100% of either or any ratio of both. The particular type of calcium sulfate hemihydrate and the ratio of atmospheric to pressure calcined will depend upon the specific application for which the mix is used. The fluidizer may be a sodium or potassium based derivative of napthalene sulfonate formaldehyde condensate. In the example, the fluidizer was potassium based, Lomar HP, Diamond Shamrock. The extender is sodium citrate. Alternatively in lieu thereof or in combination therewith, fly ash may be used. The surfactant is a hydrocarbon based on a powdered carrier Colloid defoamer 1513 DD; Colloids, Inc.

Preferably, the composition is pre-mixed and subsequently, the sand and water are added. The methods of mixing and pouring are well known in the art and need not be described in detail. They are set forth in the aforementioned patents.

The following tests confirm the unique physical characteristics of the inventive composition and particularly, the uniform dust free surface of the mix after set up.

TEST I

Density and Compressive Strength-Essentially in accordance with ASTM C-472 except that a dry masonry sand and water was used in the proportions set forth below.

Shrinkage-In accordance with ASTM C-157 except the specimens were air cured.

Composition: 80 lbs.
Sand: 1.89 cubic feet
Water: 7.70 gallons

| Density p.c.f. | Compressive Strength psi |
|---|---|

-continued

| | |
|---|---|
| 104.2 | 1786 |
| 104.9 | 1780 |
| 104.3 | 1925 |
| 105.1 | 1942 |
| 105.0 | 1913 |
| 104.7 Average | 1870 Average |
| 24 Hour Shrinkage %: | 7 Day Shrinkage %: |
| .0002 | .0042 |

Indentation Test

Test panels were cast ¾" thick and allowed to air dry. Indentation was evaluated by loading the surface of the panels with a 1" diameter disc.

| Load on a 1" Disc | Observations |
|---|---|
| 1250 | No Indentation |
| 1500 | No Indentation |
| 1750 | Slight Indentation |
| Setting Time: | |
| (Modified Vicat) ASTM C-472 = 55 Minutes | |

TEST II

Composition: 80 lbs.
Sand: 1.80 Cubic Feet
Water: 7.85 Gallons

| Density p.c.f. | Compressive Strength psi |
|---|---|
| 104.8 | 1485 |
| 105.2 | 1622 |
| 104.1 | 1555 |
| 105.5 | 1520 |
| 105.0 | 1538 |
| 104.9 Average | 1544 Average |
| 24 Hour Shrinkage %: | 7 Day Shrinkage %: |
| .00002 | .0047 |

Indentation Test

Test panels were cast ¾" thick and allowed to air dry. Indentation was evaluated by loading the surface of the panels with a 1" diameter disc.

| Load on a 1" Disc | Observation |
|---|---|
| 1250 | No Indentation |
| 1500 | No Indentation |
| 1750 | Slight Indentation |
| Setting Time: | |
| (Modified Vicat) ASTM C-472 = 86 Minutes | |

Other water soluble vinyl polymers are believed to be suitable for use in my invention; as well as water soluble calcium stearate to improve water resistance.

Having described my invention what I now claim is:

1. A flooring mix which consists essentially of:
   (a) a composition comprising calcium sulfate hemihydrate admixed with 0.005625 parts ±50% of a compound selected from the group consisting of water soluble polyvinyl alcohol and calcium stearate;
   (b) sand in an amount of from 1.8 to 2.5 parts by weight based on one part by weight of the calcium sulfate hemihydrate; and
   (c) water in an amount of from 0.6 to 0.9 parts by weight based on one part by weight of the calcium sulfate hemihydrate, the mix when set characterized by a dust free surface.

2. The mix of claim 1 which comprises a surfactant, an extender and a fluidizer present in the composition in an effective amount.

3. A composition for use in a flooring mix which when mixed with sand and water will set to form a flooring having a dust free surface which consists essentially of;
   calcium sulfate hemidyrate admixed with 0.005625 parts ±50% of a compound selected from the group consisting of water soluble polyvinyl alcohol and calcium stearate.

4. The composition of claim 3 which includes effective amounts of surfactant, extender and fluidizer.

* * * * *